May 15, 1956     W. I. JONES     2,745,159
HEAT SEALABLE PLASTIC FASTENER AND ASSEMBLY
Filed March 30, 1951
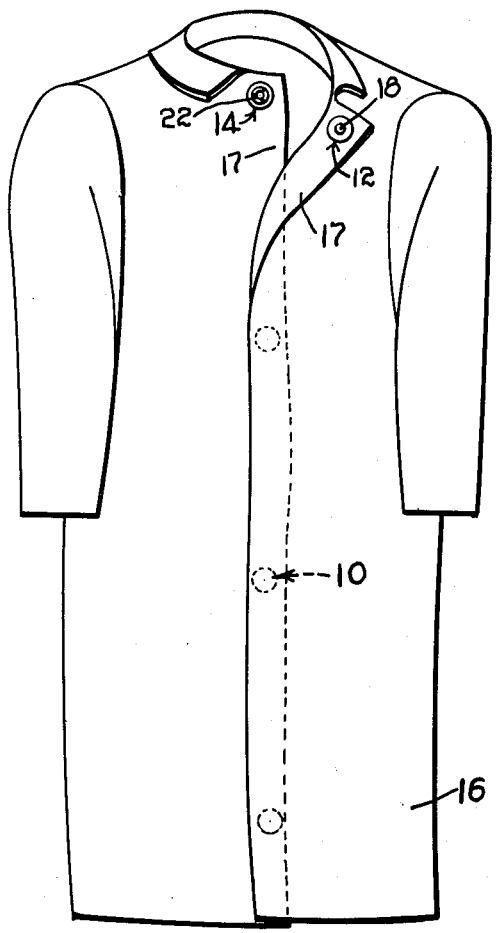
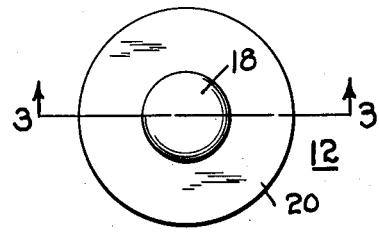
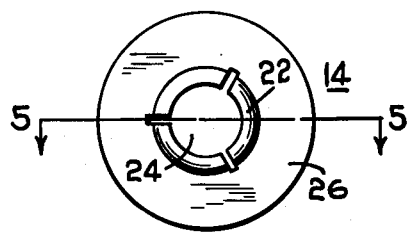
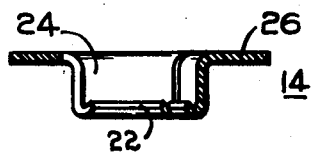
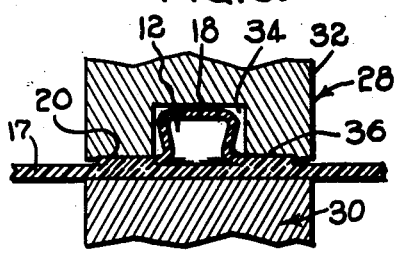
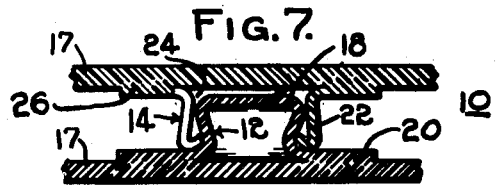
INVENTOR:
WALTER I. JONES.
BY Robert E Ross
AGENT.

United States Patent Office 2,745,159
Patented May 15, 1956

2,745,159

HEAT SEALABLE PLASTIC FASTENER AND ASSEMBLY

Walter I. Jones, Belmont, Mass., assignor, by mesne assignments, to United-Carr Fastener Corporation, Boston, Mass., a corporation of Delaware Application March 30, 1951, Serial No. 218,301

1 Claim. (Cl. 24—213)

This invention relates generally to fastening devices, and to an article of manufacture utilizing such fastening devices.

Certain articles of clothing, such as raincoats and the like, are frequently formed of synthetic organic plastic sheet material. Such garments not only have the advantage of being light and extremely compact when folded up for storage, but they may also be manufactured very cheaply, since the component parts of the garment may be joined by heat sealing the edges of the plastic, rather than by the more expensive operation of stitching.

For the greatest economy in production of such garments, it has been found desirable to use snap fasteners thereon to provide means for closing the front opening, since such fasteners are cheaper and are more easily attached than conventional buttons. However, the use of such fasteners on plastic sheet material has been found to have a number of disadvantages.

Since both the stud and the socket parts of such fasteners are ordinarily secured to the plastic sheet by an attaching member disposed on the opposite side of the sheet, there must necessarily be a hole through the sheet at the point of attachment. Hence, when the sheet is pulled to disengage the fastener parts from each other, unless the portion of the sheet surrounding the hole is securely clamped between the fastener part and the attaching member, the sheet will be stretched at that point, and the fastener will frequently tear out of the sheet.

To assist in preventing this, it is common to form the edge portion of the plastic sheet to which the fastener is attached of several reinforcing layers of material. However, not only does this necessitate the use of a greater amount of plastic sheet and increase the cost of the garment by reason of the labor involved in forming such edge portions, but it does not completely solve the problem, since there still must be an opening through the reinforcing layers and the sheet itself. Hence, tension applied to the sheet will still tend to tear the sheet at the point of attachment.

The object of the invention therefore is to provide an assembly including a base sheet at least the outer surface of which is a continuous pellicle of synthetic organic thermoplastic material (and which may be a garment formed essentially from a self-sustaining sheet of such material) having attached thereto in an effectively integral manner a fastener element separately molded from similar plastic material which is compatible with that of the base sheet surface from which it projects and secured thereto by an autogenous joint resulting from a superficial fusion and merger of the materials of the opposed surfaces. By compatible I mean that the materials if liquefied would be capable of dissolving one in the other. No piercing of the base sheet is involved and such temporary change in the physical state of the materials incident to their joining is limited essentially to their confronting surfaces and does not affect the integrity or finish of adjacent portions of the base sheet.

In the drawing:

Fig. 1 is a view in elevation of a garment having fasteners attached thereto in accordance with the teachings of the invention;

Fig. 2 is a top plan view of a snap fastener stud formed of an organic thermoplastic material for attachment to a garment as shown in Fig. 1;

Fig. 3 is a view in section taken on line 3—3 of Fig. 2;

Fig. 4 is a top plan view of a snap fastener socket member for attachment to a garment as shown in Fig. 1;

Fig. 5 is a view in section taken on line 5—5 of Fig. 4;

Fig. 6 is a view in elevation, partly in section, illustrating the method of attachment of the fasteners to a sheet of thermoplastic material;

Fig. 7 is a view in section showing the attached stud and socket members snapped into engagement.

Referring to the drawing, there is illustrated a snap fastener assembly 10, comprising a stud 12 and a socket 14, which are adapted for attachment to an article of clothing 16 such as a raincoat or the like. The article 16 to which the fastener parts are to be attached is of the type which is at least partially formed of synthetic organic plastic sheet material 17 which is heat sealable, that is, the edges of the garment may be joined by applying heat thereto either from a smooth heated metal surface or by high frequency electronic techniques. Types of plastic sheet which can be heat sealed are well known in the art, and include such materials as polyvinyl chloride, vinyl chloride-acetate compounds, polyvinylidene chloride, vinyl chloride-vinylidene chloride copolymers, polyvinyl alcohol, polyethylene, and rubber hydrochloride.

The snap fastener parts 12 and 14 are each preferably formed of a single piece of organic plastic, and may be any type of thermoplastic material which is suitable for molding. Any of the materials mentioned above in connection with the composition of the sheet which have the required rigidity after molding are suitable. The stud 12 comprises generally a shouldered stud portion 18 and a relatively flat circular base 20 disposed at one end of the stud portion. The socket 14 preferably comprises a series of circumferential shouldered stud-engaging members 22 forming a central opening 24 for receiving the stud portion 18, and a circular base 26 disposed thereabout.

The method of attachment of the fastener parts to the garment is illustrated in Fig. 6 where is shown a schematic representation of a heat-sealing apparatus 28 comprising a lower base plate 30 and an upper movable member 32, which is provided with a central recess 34 and an annular contact surface 36.

To accomplish the attachment of a fastener part such as the stud 12 to the sheet 17, the sheet is placed over the base plate 30, and the stud is then placed on the sheet in the desired position. The member 32 is then lowered so that the stud portion 18 enters the recess 34 and the contact surface bears against the upper side of the base 20 so that the base 20 and the sheet 17 are forced tightly together while the heat is applied thereto. The lower surface of the base then fuses into the upper surface of the sheet, so that the stud becomes integral with the sheet, and is securely attached thereto. The socket 14 is attached by a similar operation.

Thus, both parts of the fastener may be attached to the garment without the necessity of piercing a hole in the plastic sheet which would provide a weak spot at which failure might occur. Since the base of the fastener part actually becomes integral with the sheet, tension applied to the sheet to disengage the fastener is transmitted directly to the fastener parts with no danger of slippage of the sheet relative to the parts, as is the case where a fastener is retained on the sheet by the clamping action of two separate parts disposed on opposite sides of the sheet. By the use of all-plastic fasteners, a considerably lighter disengaging action can be obtained than is feasible with metal fasteners, thereby reducing the strain on the sheet during disengagement.

In describing two part snap fasteners it is usual to term the male member a stud and the female member a socket. In either case they include an axially extended element which may be circumferentially continuous like the part 18 in the example illustrated, or split as in the case of the socket 22, which element at axially different points is of differing transverse dimensions to define an intermediate shoulder outwardly overhanging in the case of the stud and inwardly overhanging in the case of the socket as seen in Figs. 3 and 5 respectively for snapping engagement with cooperating elements of a companion member. Such an element whether male or female may be termed a post.

Since certain obvious modifications may be made in the device without departing from the scope of the invention, it is intended that all matter contained herein be interpreted in an illustrative and not in a limiting sense.

I claim:

An assembly comprising a flexible base sheet at least the outer surface of which is a continuous pellicle of synthetic organic thermoplastic material and, associated therewith, a one-piece fastener element of similar thermoplastic material compatible with that of the pellicle, the fastener element comprising a post extending away from the surface and having an inner portion and outwardly thereof an enlarged head defining an inwardly facing overhanging shoulder, the post having a hollow centre defined by an encircling wall of the thermoplastic material and having at its inner end portion an extension of said wall projecting radially outwardly in the form of a thin annulus of substantially uniform thickness presented to the sheet, the outer periphery of the annulus defining the outer periphery of the inner end of the fastener element, the opposed surfaces of said annulus and of the pellicle throughout the area of the annulus and to the exterior boundary thereof being fusedly connected in an autogenous joint.

References Cited in the file of this patent

UNITED STATES PATENTS

| | | |
|---|---|---|
| 2,183,277 | Heilhecker | Dec. 12, 1939 |
| 2,269,419 | Adler et al. | Jan. 13, 1942 |
| 2,321,116 | Welch | June 8, 1943 |
| 2,368,100 | Boenecke | Jan. 30, 1945 |
| 2,397,801 | Mitchell | Apr. 2, 1946 |
| 2,414,051 | Mallory | Jan. 7, 1947 |
| 2,438,429 | Callahan et al. | Mar. 23, 1948 |
| 2,470,963 | Weyl | May 24, 1949 |
| 2,569,398 | Burd et al. | Sept. 25, 1951 |
| 2,656,541 | Weaver et al. | Oct. 27, 1953 |

FOREIGN PATENTS

| | | |
|---|---|---|
| 4,729 | Great Britain | 1908 |
| 995,680 | France | Aug. 22, 1951 |

OTHER REFERENCES

An Electronic "Sewing Machine"—published Radio Corp. of America, TJ 1513, H 78, August 1943—Div. 24.